United States Patent [19]
Jones

[11] Patent Number: 5,832,458
[45] Date of Patent: Nov. 3, 1998

[54] SYSTEM AND METHOD FOR ELECTRONICALLY AUDITING POINT-OF-SALE TRANSACTIONS

[75] Inventor: Charles R. Jones, Dallas, Tex.

[73] Assignee: Electronic Data Systems Corporation, Plano, Tex.

[21] Appl. No.: 974,146

[22] Filed: Nov. 19, 1997

Related U.S. Application Data

[63] Continuation of Ser. No. 488,227, Jun. 7, 1995, abandoned.

[51] Int. Cl.⁶ .................................................... G06F 17/60
[52] U.S. Cl. ................................ 705/14; 705/11; 705/21
[58] Field of Search ............................... 705/1, 7, 10, 11, 705/14, 16, 21, 24; 395/200.54, 200.57; 235/375, 376

[56] References Cited

U.S. PATENT DOCUMENTS

| | | | |
|---|---|---|---|
| 4,723,212 | 2/1988 | Mindrum et al. | 345/214 |
| 4,910,672 | 3/1990 | Off et al. | 395/214 |
| 4,937,742 | 6/1990 | Marshall | 364/401 R |
| 4,972,501 | 11/1990 | Daniel, Jr. et al. | 455/2 |
| 5,008,519 | 4/1991 | Cunningham et al. | 235/383 |
| 5,056,019 | 10/1991 | Schultz et al. | 395/214 |
| 5,128,520 | 7/1992 | Rando et al. | 235/375 |
| 5,173,851 | 12/1992 | Off et al. | 395/214 |
| 5,192,854 | 3/1993 | Counts | 235/375 |
| 5,208,445 | 5/1993 | Nahar et al. | 235/375 |
| 5,216,502 | 6/1993 | Katz | 348/150 |
| 5,253,345 | 10/1993 | Femandes et al. | 395/275 |
| 5,305,195 | 4/1994 | Murphy | 395/201 |
| 5,315,093 | 5/1994 | Stewart | 235/381 |
| 5,321,604 | 6/1994 | Peach et al. | 395/214 |
| 5,353,218 | 10/1994 | De Lapa et al. | 395/214 |
| 5,377,095 | 12/1994 | Maeda et al. | 364/401 R |
| 5,490,060 | 2/1996 | Malec et al. | 364/401 R |

FOREIGN PATENT DOCUMENTS

| | | | |
|---|---|---|---|
| 0331442A3 | 9/1989 | European Pat. Off. | G06F 15/24 |
| 2189064 | 10/1987 | United Kingdom | G06F 15/21 |
| WP94/09440 | 4/1994 | WIPO | G06F 15/16 |
| WO95/30201 | 11/1995 | WIPO | G06F 19/00 |

OTHER PUBLICATIONS

An article by Michael Garry entitled "In a Holding Pattern" in *Progressive Grocer*, pp. 124, 124 and 128, May 1995 issue.

Haber; "LAN VAR Shopping Spree: Lucrative Market Among Small, Specialty Stores"; *Computer Reseller News*; Oct. 15, 1991; p. 23; Dialog: File 16, Acc# 03412638.

Frasier–Sleyman; "Benchmark Your Way to Forecasting Excellence"; *Journal of Business Forecasting*; v11 n1; pp. 6–10; Spring 1992; Dialog: File 15, Acc# 00726221.

*Primary Examiner*—Stephen R. Tracs
*Attorney, Agent, or Firm*—Robert W. Holland; L. Joy Greibenow

[57] ABSTRACT

An automated system and method for electronically auditing point-of-sale transactions is provided. Each retail store outfitted with the present invention has at least partially automated point-of-sale system for processing a retail sales transaction in the normal operation of the retail store. A non-invasive automated electronic auditing system is disposed in each store for monitoring the point-of-sale system in a substantially totally passive manner and for collecting a copy of each retail sales transactions on the point-of-sale system. The electronic auditing system preferably includes a sensor assembly for detecting the processed retail sales transactions and a computer processor coupled to the sensor assembly for processing the detected retail sales transactions. The point-of-sale system operates independently of the electronic auditing system; the electronic auditing system operating responds to the point-of-sale system without requiring any responsive operation by the point-of-sale system and without requiring any modificaiton of the point-of-sale system. An audit system processor is also provided which is remotely located from the retail store for receiving the processed retail sales transaction data for subsequent use by manufacturers.

17 Claims, 3 Drawing Sheets

SYSTEM AND METHOD FOR ELECTRONICALLY AUDITING POINT-OF-SALE TRANSACTIONS

This application is a continuation of application Ser. No. 08/488,227, filed Jun. 7, 1995 now abandoned.

BACKGROUND OF THE INVENTION

1. Field of the Invention

This invention relates generally to point-of-sale computer systems of the type used in retail stores to record sales transactions. More particularly, the invention relates to electronically recording and auditing sales transactions.

2. Description of the Related Art

The use of discount coupons in retail marketing have been found by manufacturers and retailers to be an effective tool to incent customers to try, repurchase or stock-up on selected goods. Many manufacturers distribute discount coupons for their products through the mail, or by printing them in newspapers or magazines, or enclosing them in similar or related product packages. Manufacturers facilitate identifying specific coupons, and entering information concerning them into point-of-sale data processing systems used by retail establishments, by having bar codes printed on their coupons so that the coupons can be scanned by the same type of equipment widely used for scanning bar code labels on merchandise items to be purchased. The printed coupons typically specify the goods or family of products which must be purchased to qualify, the face amount in cash or goods to be redeemed, and the terms which are required of the retailer to qualify for reimbursement.

When a customer presents a discount coupon at the time of purchase of an appropriate product, the cashier operating the point-of-sale terminal will scan or key in the coupon amount. The discount set forth on the coupon's face is then subtracted from the customer's bill.

Handling and accounting for these coupons has become a very real problem however. First of all, the implementation of coupon redemption and settlement is an enormous and tedious business. From the consumer's redemption of the coupon through the retailer's reimbursement, counting of the coupons (for settlement and for audit) is done by hand. The check-out cashier must inspect all tendered coupons, which not only wastes precious check-out time as the cashier carefully reviews the coupon, but also frequently results in accidental misredemption of coupons. Examples of such unintended coupon misredemption may include overlooking an expiration date, or overlooking the exact product specification for which the coupon is valid, i.e., only certain size package may have been stipulated on the coupon.

Next, the store manager or his representative daily manually collects and tracks the coupons redeemed in his store. In a large supermarket, there is likely to be a large volume of coupons redeemed, resulting in a substantial amount of manual, time-consuming, and error-prone work. The manager will also normally spot check (manually audit) about 10–20% of the cashiers' coupon tender, by comparing cash register receipt reports against the actual face value of the coupons submitted in the cashier's cash drawer. If the store is part of a chain, the coupons are sent to chain headquarters where, again, the coupons are manually collected and tracked.

At this point, the coupons are generally passed from the retailer on to a third party, often referred to as a retailer's coupon clearing house, who manually processes (sorting and counting) the coupons of a multitude of manufacturers received from many retailers. Typically, the sorting and counting work is done out of the country, where it may be done more cheaply, and the results returned to the U.S. for billing of the manufacturer and crediting of the retailers. The results and the corresponding coupons are frequently instead provided to a manufacturer's coupon clearinghouse before providing their assessment to the manufacturer. Specifically the manufacturer's coupon clearing house performs another manual audit to verify the settlement billed and does its best, under the circumstances, to identify suspected (but often not provable) fraud or misredemption. This overall redemption/settlement process inevitably results in retailers claiming they have been under-credited, while manufacturers claim they have been over-charged.

Another disadvantage of the current coupon redemption and settlement process, which threatens the overall efficacy of coupon usage, is that of fraud or intentional coupon misredemption. One estimate places total coupon misredemption at about 15% of those coupons redeemed. Intentional misredemption can occur in a number of ways. For example, an overbearing customer can intimidate an inexperienced cashier into accepting a coupon for the wrong size product or the wrong brand. Furthermore, particularly in larger and busier stores, register personnel may slip a stack of their own coupons into the cash register and exchange them for cash. As yet another example, a retailer can accumulate, through any number of methods, quantities of coupons and present them to the coupon clearing houses for payment.

Unfortunately, the warning which appears on many coupons, e.g., "Invoices showing purchase of adequate stock to cover all coupons redeemed must be shown upon request", is so costly to enforce, that intentional coupon misredemption runs rampant. Manufacturers have become more aggressive in handling "suspicious" coupon shipments as evidenced by a higher level of coupon redemption payment denials. The denial of a coupon redemption payment, however, is a highly sensitive situation because of the on-going trade relations between manufacturers and their customers, the retailers.

Although various approaches have attempted to address different deficiencies of the current couponing system, none have solved all of the problems. For example, Marshall et al. discloses in U.S. Pat. No. 4,937,742, entitled "AUTOMATED SYSTEM FOR STATISTICALLY ANALYZING DATA CHARACTERISTICS OF SHIPMENTS OF COUPONS TO IDENTIFY INSTANCES OF COUPON SHIPMENT PARAMETRIC ABNORMALITIES" a system and method for the automated statistical analysis of bulk paper coupon shipment data characteristics in order to identify coupon shipment parametric abnormalities. Detected abnormalities may result in a decision to deny payment or to defer the payment decision until additional information is obtained. While this is a good approach to addressing obvious coupon shipment abnormalities, it still requires clearing houses to audit the coupon redemption process by handling, tracking and maintaining the actual paper coupons.

Another solution, electronic validation of coupons, addresses the issue of accidental or unintentional misredemption. Virtually all package goods carry a Universal Product Code (UPC) identifier and many retail outlets, especially grocery stores, have their check stands equipped with a scanning device to read this bar code and identify the retail price to the customer and the cashier. The software and hardware to provide this service are commonly referred to as a point-of-sale (hereinafter referred to as "POS") system. Such POS system is normally either self-contained within a check-stand and register or, more commonly, is part of a local network where the files for matching UPC and price are linked via a loop with the checkstands in the store.

Coupons typically also bear a bar code identifying the item or group of items which qualify for a price reduction. Various systems perform electronic validation of coupons by comparing the bar code of each tendered coupon with the bar code(s) of the item(s) scanned for purchase in a transaction. Such systems permit electronic redemption of a coupon instead of having the cashier manually verify that the item(s) purchased qualify for the incentive on the coupon. An example of such an system is that of Catalina Electronic Clearing Services. With such a system, data corresponding to the coupon redemption, i.e., store, amount of discount, manufacturer, date of coupon redemption, is electronically captured and forwarded to a central processor. There the data is divided electronically by manufacturer and sent on paper or diskette to individual manufacturers or their clearinghouses for settlement. The redeemed coupons are still collected and tracked because almost all manufacturers are not willing to accept the results of electronic validation of coupon redemption because of the continued opportunity for intentional misredemption, and the inability to audit the transactions which lead to the electronic validation of coupons for redemption because of the capability of operator overrides of the electronic coupon validation system.

SUMMARY OF THE INVENTION

Coupons are normally ultimately redeemed by manufacturers of the goods to which the coupons relate, with reimbursement being made to the retail stores accepting the coupons. Therefore, a precise accounting system for the coupons's redemption that insures the coupons have been used only in connection with the specific articles for which they were issued, is needed.

In view of the above problems associated with the related art, it is an object of the present invention to provide a system and method for conducting an electronic audit with respect to sales transactions, including those involving coupon redemption, based on the transaction data recorded by a POS terminal and interpreted by the store's master file for items and prices.

Another object of the present invention is to provide a system and method for conducting an electronic audit in which audit transaction data are collected on a real-time basis and transmitted in an expeditious manner to a central site for use by manufacturers during settlement.

A further object of the present invention is to provide a system and method for establishing of a reliable audit trail of the purchaser's transaction for verifying compliance with the terms of a coupon.

An additional object of the present invention is to provide a system and method for conducting audit in which accurate, verifiable retails sales transaction data are collected, processed and made available to manufacturers and retailers, independent of the redemption activities of the retail stores or retail store chains, to provide for a rapid identification of potential problems and timely resolutions between manufacturers and retailers.

Yet another object of the present invention is to provide a relatively inexpensive system and method for conducting an electronic audit which is independent of and non-invasive to the in-store POS system (IPS) under surveillance to resist tampering and to reduce the technology cost of gathering audit data.

A still further object of the present invention is to provide a system and method for electronically auditing a POS transaction and retaining the POS transaction data for a sufficient period to provide for the systematic detection of coupon misredemption.

The present invention achieves these and other objects by providing a system and method for electronically auditing coupon redemption by retailers who commonly electronically redeem coupons, regardless of whether they also electronically validate these coupons. By providing an auditable and secure process for electronic redemption, the traditional paper-based audit can be eliminated and settlement between parties can be handled faster and with greater cost efficiency. An electronic audit of coupon redemption with multiple safeguards against deliberate or inadvertent misredemption provides significant benefits to both manufacturers and retailers.

In one aspect of the present invention, an automated system and method for electronically auditing point-of-sale transactions is provided. Each retail store outfitted with the present invention has at least partially automated point-of-sale system for processing a retail sales transaction in the normal operation of the retail store. A non-invasive automated electronic auditing system or auditor is disposed in each store for monitoring the point-of-sale system in a substantially totally passive manner and for collecting a copy of each retail sales transactions on the point-of-sale system. The electronic auditing system preferably includes a sensor assembly for detecting the processed retail sales transactions and a computer processor coupled to the sensor assembly for processing the detected retail sales transactions. The point-of-sale system operates independently of the electronic auditing system; the electronic auditing system operating responds to the point-of-sale system without requiring any responsive operation by the point-of-sale system and without requiring any modificaiton of the point-of-sale system. An audit system processor is also provided which is remotely located from the retail store for receiving the processed retail sales transaction data for subsequent use by manufacturers.

In another aspect of the invention, a method for electronically auditing point-of-sale transactions is provided.

An electronic audit system within a retail store passively records an entire point-of-sale system sales transaction and stores it in an audit transaction database. The electronic audit system continues to record and store transactions as they occur until a request for uploading of the stored records is received by the electronic audit system. The stored records are communicated to an audit system processor which is remotely located from said electronic audit system. The audit system processor analyzes the communicated records based on predetermined guidelines stored in the audit system processor and prepares reports based on the results of the audit system processor's analysis. The reports flag activity of the point-of-sale system which is a predetermined statistical deviation from normal. In another embodiment of the invention, the reports flag predetermined incremental increases relative to a benchmark in sales of at least one selected product.

The system and method of the present invention provides a robust and auditable process to ensure the accurate and timely settlement between consumer goods manufacturers and the retailers of their products when the manufacturer issues coupons or when the manufacturer agrees to a temporary price reduction in return for retailer support that should lead to increased sales volumes ("trade promotions"; discussed below).

BRIEF DESCRIPTION OF THE DRAWINGS

These and other features and advantages of the invention will be apparent to those skilled in the art from the following detailed description of preferred embodiments, taken together with the accompanying drawings, in which.

DETAILED DESCRIPTION OF THE PREFERRED EMBODIMENTS

Figure 1:
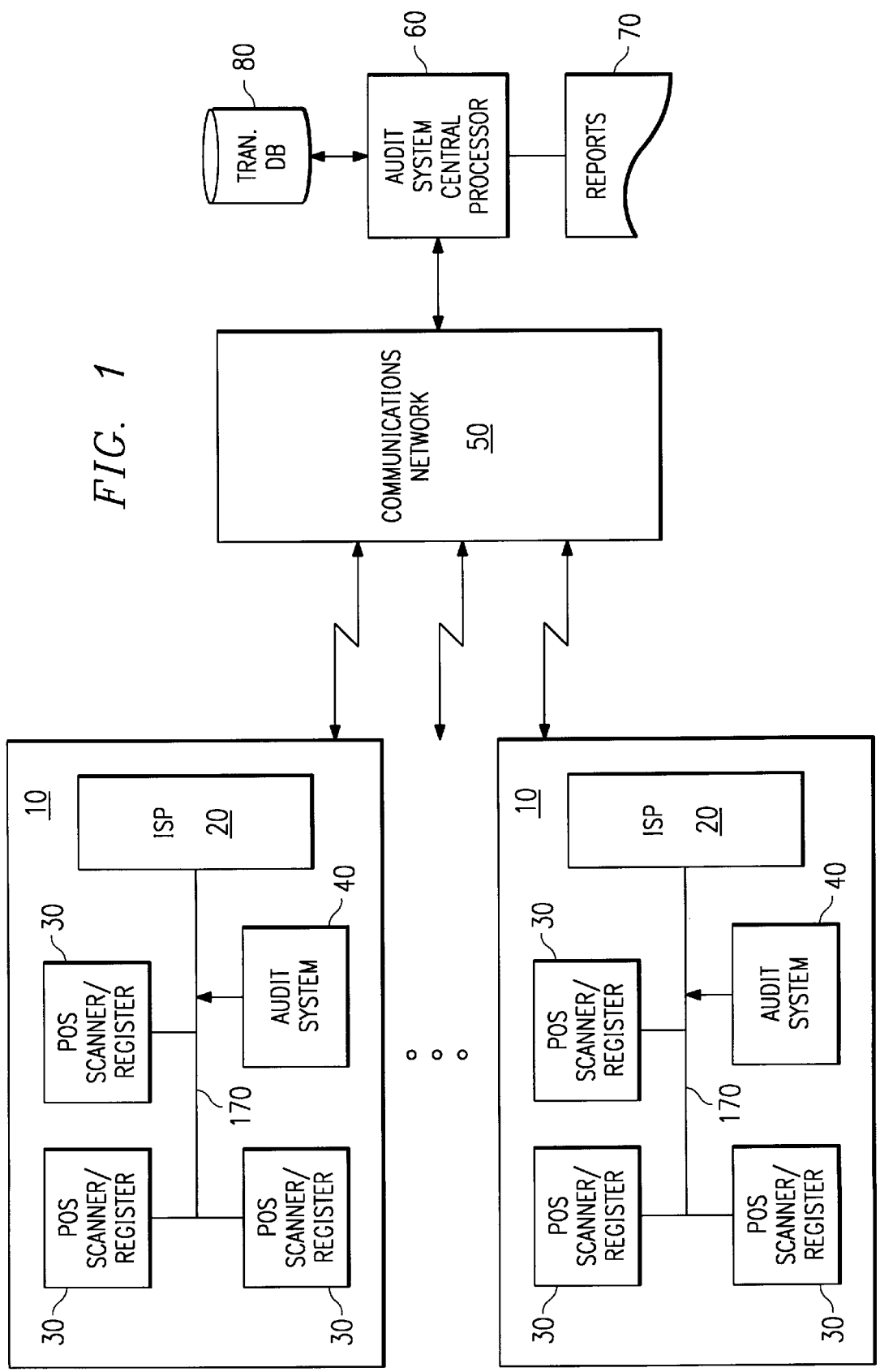
FIG. 1 is a schematic block illustration of an electronic audit system and method for a point-of-sale system constructed in accordance with the principles of the present invention.

As shown in the drawings for purposes of illustration, the present invention is concerned with electronically auditing sales transactions on point-of-sale systems. FIG. 1 is a schematic illustration of an electronic audit system and method for a point-of-sale system constructed in accordance with the principles of the present invention. Specifically, by way of background, in each store 10 in which the invention is to be used, there is an in-store processor (ISP) 20 which controls at least one point-of-sale checkout terminal, each terminal having an associated POS optical scanner and register 30. Associated with ISP 20 are a number of files, not shown, which are used by ISP 20 to provide information to the terminals 30. In a typical point-of-sale system, the files contain a record for each product in each store 10, and are used to access price and other information concerning the product.

In accordance with the present invention for conducting an electronic audit of POS transactions, disposed in each retail store 10 is an in-store electronic audit system 40 for collecting, processing and storing on a real-time basis retail sales transaction data in a totally passive or non-invasive manner with respect to the on-going operations of retail store 10. However, electronic audit system 40 does not interfere with or require the active participation of in-store ISP 20 (computer) controlling the normal operation of the one or more POS terminals 30 in each retail store 10. Periodically, each electronic audit system 40 transmits the retail sales transaction data it has collected through a bidirectional communications network 50 to an audit system central processor 60 for further processing and use by manufacturers and retailers.

Each retail sales transaction detected, interpreted, processed and stored by electronic audit system 40 preferably contains data corresponding to the identification of the particular retail store 10, the time of day and date of the transaction, the U.P.C. of each retail product involved in the transaction (including overrides), the price of that product, the quantity purchased of that product, the identification of POS scanner/register 30 at which the transaction occurred, an identification of the cashier on the POS scanner/register 30 by cashier identification code, a brief description of each product, any coupon redemptions (including overrides), sales taxes, the method of payment, returns and/or voided purchases or transactions.

Figure 2:
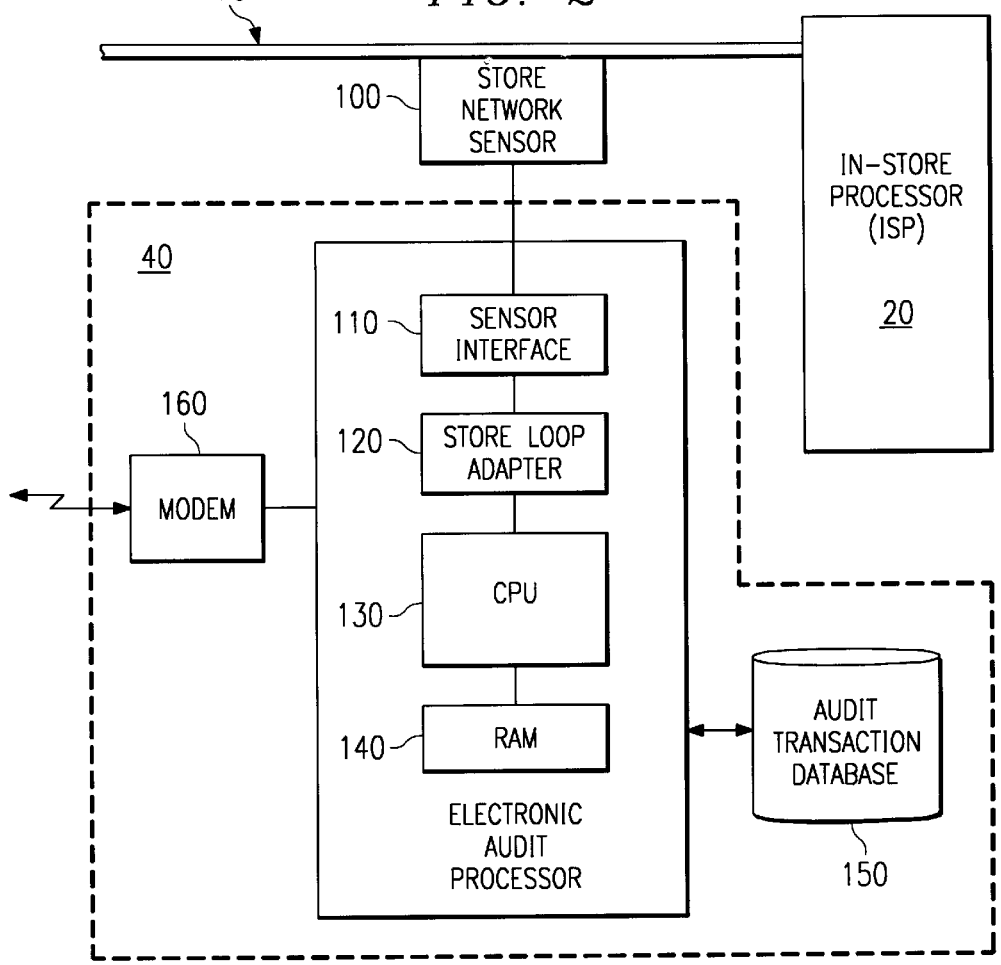
FIG. 2 is a schematic block diagram of an embodiment of the in-store portion of the present invention.

Consider now FIG. 2, which is a schematic block diagram of an embodiment of the in-store portion of the present invention. Each electronic audit system 40 consists of a substantially totally passive or non-invasive store network sensor assembly 100, sensor interface 110, store loop communications adapter 120, central processing unit 130, random access memory 140, audit transaction database 150, and communications modem 160 for connecting electronic audit system 40 to communications network 50. Electronic audit system 40 may utilize one of a number of conventional data transmission protocols and, if desired, encryption schemes in communicating with audit system central processor 60 to ensure the highest reliability and security of the collected transaction data.

Importantly, each electronic audit system 40 operates unattended, requiring no intervention by POS scanner/register 30 operators or by ISP 20. The system and method of the present invention requires no software or program modifications to each retail store's ISP 20 used in controlling the normal operations of each retail store. Each electronic audit system 40 continuously monitors, detects, interprets, processes and stores data from its retail store under the control of an operating program stored in electronic audit system 40, which program may be periodically updated or modified from the remotely located audit system central processor 60. Audit system central processor 60 includes one or more central computers for collecting data from each electronic audit system 40 and for further processing the data for subsequent analysis and use by manufacturers and retailers.

Returning momentarily to FIG. 1 of the drawings, there is illustrated a new and improved electronic audit method and system constructed in accordance with the principles of the present invention. The method and system of the present invention may be used in any retail stores that utilize Point-Of-Sale (POS) optical scanners in their normal retail store operation to detect bar coded information, such as a Universal Product Code (UPC), affixed to the retail products being sold. More specifically, each retail store 10 in the system is provided with an electronic audit system 40 that is connected by a sensor assembly 100 to a conventional store data and control loop 170 in a substantially totally passive or non-invasive manner so as not to interfere with or otherwise jeopardize the normal operations of POS scanners/registers 30 or of ISP 20, all of which are interconnected by store loop 170. Typically, store 10's ISP 20 controls the operation of the scanners/registers 30 by the exchange of digital data signals throughout store loop 170. Sensor assembly 100 preferably is disposed adjacent a portion of the store loop 170 to enable the digital data signals present in store loop 170 to be detected by sensor assembly 100 and to be interpreted, locally processed and eventually transmitted by electronic audit system 40 through a communications network 50 to audit system central processor 60 for further processing and subsequent analysis/review by manufacturers and retailers.

In the preferred embodiment of the present invention, communications network 50 through which electronic audit system 40 communicates with audit system central processor 60 consists of a modem 140 dial-up or switched line telephone connection 45 to a nearby local node on a private X.25 packet-switched data communications network. Such data networks are conventional and will not be further described herein.

In another embodiment of the present invention, communications network 50 through which electronic audit system 40 communicates with audit system central processor 60 consists of a conventional dial-up or switched line telephone direct connection 140 for each retail store 10 to communicate 45 with audit system central processor 60 over a convention public telephone network.

In a further embodiment of the present invention, communications network 50 through which electronic audit system 40 communicates with audit system central processor 60 consists of a radio modem 140 connection 45 to a nearby base station forming a node on a private packet-switched data network as discussed above. The private network is preferably connected directly to audit system central processor 60.

In another alternative embodiment of the present invention, communications network 50 through which electronic audit system 40 communicates with audit system central processor 60 may take the form of a Very-Small-Aperture-Terminal (VSAT) located on the exterior roof or wall of the retail store for communicating 45 via an over-the-air Ku band microwave link to a transponder in a satellite in a geostationary earth orbit. The satellite is preferably linked to an earth transceiving station at audit system central processor 60. Such satellite communication systems are conventional and are commercially available.

Returning now to FIG. 2, sensor assembly 100 is disposed adjacent to store loop 170. For example, sensor assembly 14 may be placed physically adjacent to the electronic signal conductors or cable forming the store loop 170 or adjacent to an electrical connector in the store loop 170, for example, an electrical connector in the vicinity of ISP 20. Sensor assembly 100 detects electrical signals, typically digital data pulses, present in store loop 170 and passing between the POS scanners/registers 30 and ISP 20. Sensor assembly 100 preferably is substantially totally passive or non-invasive to store loop 170 and therefore can send no information to store loop 170. Thus, sensor assembly 100 and electronic audit system 40 cannot interfere with the normal operations of store loop 170, scanners/registers 30 and ISP 20.

Electronic audit system 40 also includes sensor interface 110 that both supplies direct current electrical power to the sensor assembly 100 and reconstructs the digital data signals present on the store loop 170 from the time varying electrical signals or pulses received from the sensor assembly 100. The store loop digital data signals reconstructed by the sensor interface 110 ar provided to a conventional store loop adapter 120 that decodes the digital signals from sensor interface 110 and passes the decoded information to central processing unit (CPU) 130. The particular store loop adapter 120 selected for use in electronic audit system 40 depends upon the particular type of scanners/ registers 30 and ISP 20 in use in that store 10. Store loop adaptor 120 is readily and commercially available and will not be further discussed herein.

The operation of CPU 130 is under the control of a software program contained in a variable or random access memory (RAM) 140. CPU 130 monitors the incoming data from store loop adapter 120 and processes that data in accordance with the programmed instructions contained in RAM 140. Processed data is periodically written onto audit transaction database (such as a direct access storage device or DASD) 150 that may take the form of a hard disk memory. Periodically, i.e., once every several hours or once a day or once every several days or once a week, retail sales transactions formatted by CPU 130 in accordance with the programmed instructions contained in RAM 140 may be transferred from audit transaction database 150 by means of communications modem 160 via communications network 50 to audit system central processor 60.

Modem 160 preferably takes the form of a conventional telephone modem that utilizes a dial-up or switched line telephone for connecting electronic audit system 40 to a nearby local node on a private X.25 packet-switched data communications network 50 and then directly to audit system central processor 60. Obviously, if the telephone is shared (not dedicated) with retail store 10 in which electronic audit system 40 is located, the communications session between electronic audit system 40 and audit system central processor 60 preferably occurs during "off" hours when the telephone is not being used by personnel within retail store 10.

During a communications session between electronic audit system 40 and audit system central processor 60, data corresponding to retail sales transactions collected and stored by electronic audit system 40 are up-loaded as discussed above to audit system central processor 60. During the same communications session, audit system central processor 60 can remotely update or change the operating program stored in RAM 140 and perform testing, as required, using standard, well-known techniques.

CPU 130, RAM 140 and audit transaction database 150 may be embodied in a commercially available personal computer or microprocessor. Sensor interface 110, store loop adapter 120 and communications modem 160 each may be implemented using conventional printed circuit boards or cards that may be plugged into the expansion bus of the electornic audit processor.

In accordance with a further important feature of the present invention, the sensor assembly 100 used in detecting digital data signals present on the store loop 170, is formed as a small unobtrusive device. Sensor assembly 100 preferably operates on a capacitive principle and, therefore, makes no intrusive physical or electrical connection to store loop 170. Sensor assembly 100 may be physically secured to a portion of store loop 170 by any conventional technique, for example, by one or more strips of adhesive tape or by plastic cable clips. As an alternate embodiment of the present invention, sensor assembly 100 may instead be directly and physically connected in parallel, e.g., hardwired together with store loop 170.

The output signal from sensor interface 110 is suitable for use as an input signal to any one of a variety of different types of store loop adapters 120 discussed hereinabove.

Figure 3:
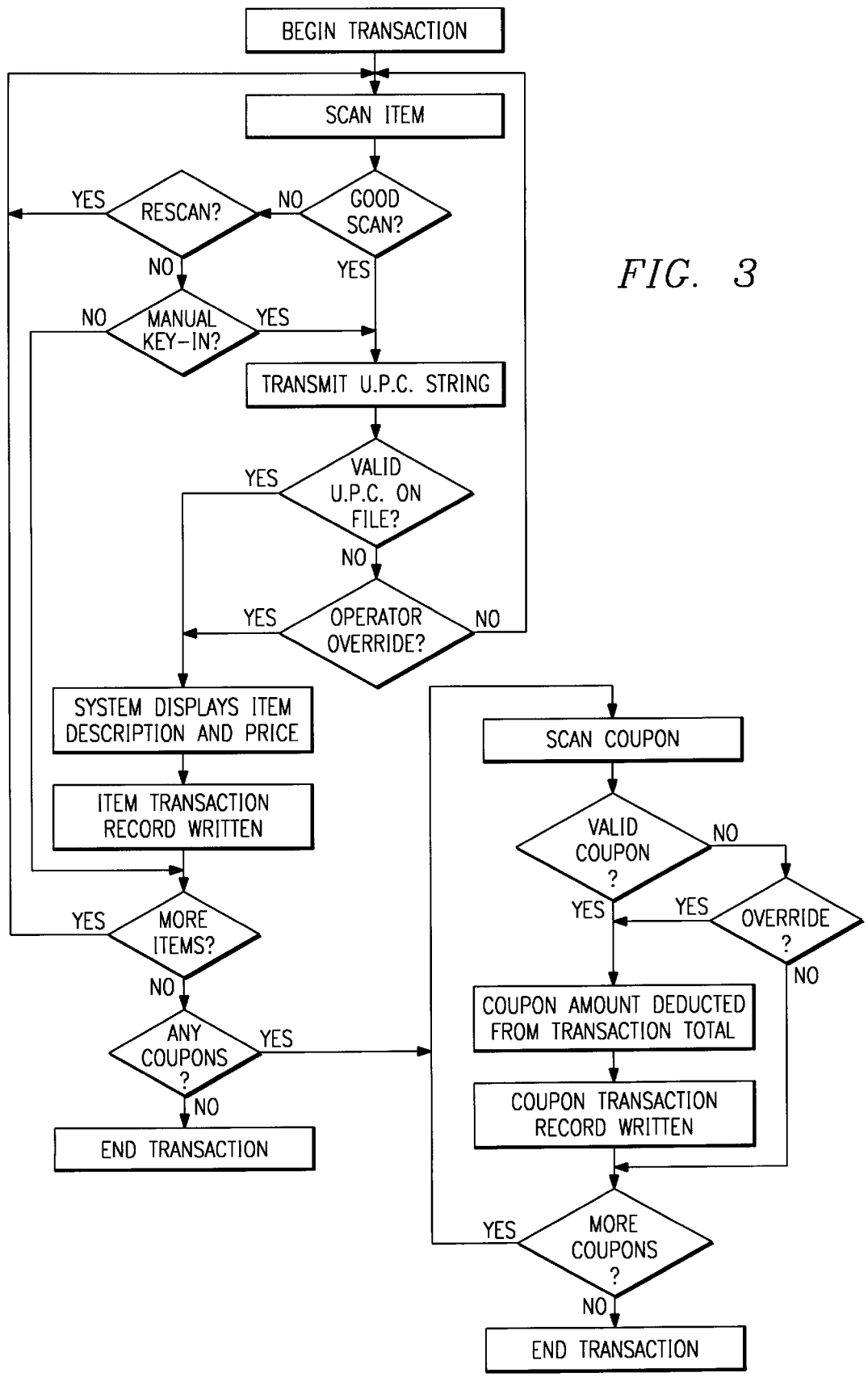
FIG. 3 is a flowchart depicting a typical POS transaction which the present invention would monitor and record.

Consider now FIG. 3, which is a simplified flow chart depicting a typical POS transaction which the present invention would monitor and record. When the transaction begins, a beginning of transaction record is written. In normal operation the check-out cashier or operator scans items for purchase in the normal way by passing them across a POS scanner window. A checker may either re-scan the bar code or manually key-in data from a product, in the event the POS scanner cannot get a good read from the purchase item's bar code. The POS scanner normally activates some form of indicator (light, sound, etc.) reflecting whether a good scan was obtained. The UPC string is transmitted to ISP 20 which checks to see if there is a universal product code (U.P.C.) corresponding to the read code on file in a database. If not, the operator has an opportunity to enter the numbers and information corresponding to the bar code information manually, either on the cash register or on the scanner.

Once the POS scanner has read the bar code, or the information has been entered manually, the POS system displays the item description and price (derived from a POS system database), usually on the cash register. An item transaction record is generated internally and stored in memory, and at the same time, the transaction record, or a portion of the transaction record, is printed on a cash register receipt which is being generated during the transaction.

Next, if there are more purchased items to be scanned, the loop continues as indicated. If there are no more items to be scanned, the cashier inquires as to whether the customer has any coupons to present. If not, as indicated in the flow chart, the transaction is ended and a record is written, and the customer tenders payment.

If the customer has any coupons, each coupon is scanned. The data is passed to coupon validation logic, if any, which determines whether each coupon correlates to any of the items purchased. The coupon validation logic sends a logic bit back to the scanner device signalling either that the coupon is valid, therefore execute further logic to deduct the value from the overall transaction total or the coupon is not valid, therefore reject the coupon. If any scanned coupon is not "valid" or redeemable for this transaction, it is rejected, and the coupon is returned to the customer. Sometimes an appropriate error message is concurrently displayed indicating that the coupon is not redeemable in this transaction. At this point the operator may again choose to manually override the system, especially for non-scannable bar-codes or when the system software incorrectly invalidates the coupon under consideration. The coupon scanning loop continues until all coupons tendered have been scanned. If a valid, redeemable coupon is read, the coupon amount is deducted from the record of the entire transaction, with this deduction shown on the register receipt, and acoupon transaction record is written. When there are no more coupons, the transaction is ended, and the customer tenders payment. The cashier then preferably destroys the valid and redeemed coupons as part of the tender process or returns unacceptable coupons to the customer.

The coupon transaction record includes all relevant information about the coupon's part of the transaction: the UPC number of the item purchased and of the coupon, the amount of credit, the time of the transaction and manufacturer. The record is stored for later batch reconciliation, or it may be used in an on-line fashion for electronic clearing, wherein the manufacturer will be debited and the retailer will be credited. This electronic clearing or electronic data interchange system is advantageous in eliminating one or more levels of manual clearing in the usual coupon clearing system discussed earlier.

Figure 4:
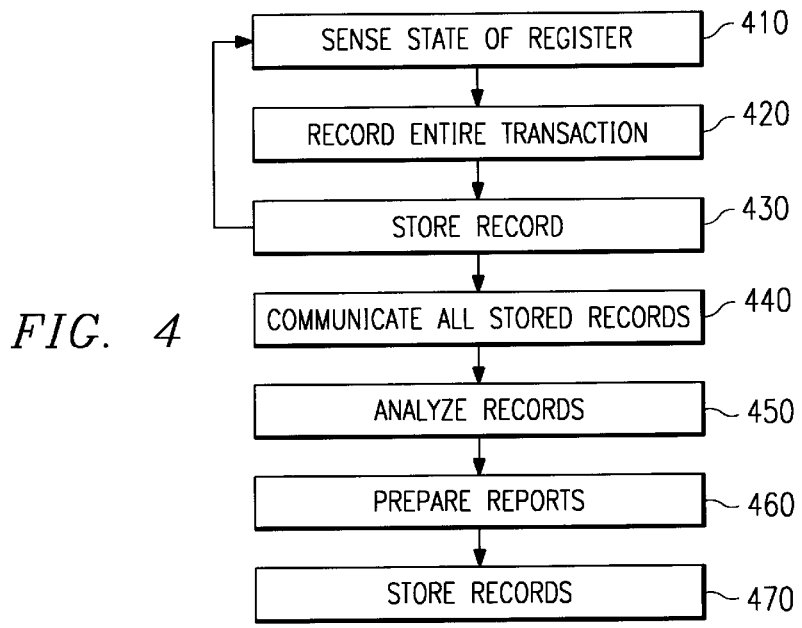
FIG. 4 is flowchart illustrating an embodiment of the method according to the present invention.

FIG. 4 depicts a flowchart setting forth the basic operation of the system and method of the present invention. Steps 410, 420, 430, and 440 illustrated in the flowchart of FIG. 4 are carried out by CPU 130 under the control of the operational instructions or program contained in RAM 140, as periodically updated or modified by downloaded data and instructions from the remotely located central processor 60. Steps 450, 460 and 470 are directly carried out by audit system central processor 60.

Electronic audit system 40 begins at block 410 by sensing the state of POS scanner/register 30 which it is monitoring. It notes whether terminal 30 is in training or active (open, transaction) mode. If coupons are redeemed while terminal 30 is in training mode, this is not a proper redemption (no corresponding purchase of goods), and such activity will be flagged.

At block 420, electronic audit system 40 builds a copy of the complete transaction it is recording. For example, when a retail product is scanned by scanner/register 30, a signal is passed by store loop 170 to ISP 20 identifying the specific scanner/register 30 involved in that transaction. Subsequently, the function being performed in the transaction, for example, the function of scanning, is normally identified, typically followed by the UPC characters and, possibly, by the quantity of the items purchased with that specific code. Typically, some of the above information is accumulated by ISP 20. However, because electronic audit system 40 is hanging passively off of store loop 170, all of this information, in fact all of the transaction itself, is recorded and stored by electronic audit system 40 in audit transaction database 150. ISP 20 normally responds with both the current price and a description of the item that was scanned, which information is addressed to the particularly scanner/register 30 that performed the scanning operation. The above information constitutes a typical retail sales transaction that is recorded by electronic audit system 40. Electronic audit system 40 monitors (passively) the transaction and records both the scanned items and the scanned coupon codes (regardless of disposition or overrides). It also monitors/tracks which register is open, which cashier is on the register (via POS loop internal data) along with time of day, day of week, month and year.

Electronic audit system 40 is also able, when the POS system it is monitoring does not have such a capability, to verify coupons redeemed as valid using a family code (from U.P.C., per grouping or family of goods) file stored in electronic audit system 40. If an invalid code is recognized or a manual coupon override is recognized (detected), electronic audit system 40 flags the transaction. As mentioned earlier, electronic audit system 40 then stores (block 430) each recorded transaction record in audit transaction database 150 for periodic uploading to audit system central processor 60 via communications network 50 (block 440).

At block 450, audit system central processor 60 then analyzes all the uploaded records from each electronic audit system 40. Based on its analysis, reports 70 are prepared at block 460. A couple of examples of the many types of reports 70 available include providing daily cashier shift report on coupon activity to store 10 manager, and providing a daily audit (by manufacturer) of coupons redeemed to store headquarters and manufacturers' agents to support the settlement process. Other examples of some of the reports 70 available from the present invention include, and not by way of limitation:

Summary of coupons redeemed (dollars total and number) by day, store, and manufacturer. If desired, this summary may be compared to a 52 week history file, with statistically high exceptions flagged.

Summary of manual overrides by store, day, and manufacturer. If desired, this summary may be compared to 52 week history, similar stores in account or a particular market, with statistical exceptions flagged.

Periodical (preferably weekly) summary by store, account and manufacturer of the dollar and total dollar level of valid coupon activity for settlement purposes.

Comparison of flagged stores with cashier habits, extremely high coupon activity, extremely fast total transaction times (sometimes indicative of fraudulent misredemptions), non-normal variations in UPC distributions, and high frequency of manual overrides.

At block 470, audit system central processor stores the uploaded records containing store 10's daily transaction file of both merchandise purchased and coupons redeemed, including any generated reports 70 for a predetermined amount of time (preferably 52 weeks minimum). This data is stored in transaction database 80.

Audit system central processor 60 also prints, as required or deemed appropriate, a potential discrepancy report 70 for both headquarters and manufacturers' agents including, but not limited to:

unusual coupon activity (by manufacturer, by brand or by item) by store, cashier, time of day, or day of week unusual number of manual overrides by manufacturer, by brand or by item for each store and cashier specific invalid coupon rejections for particular brand, item or expired code closest purchased item to coupon that was rejected (e.g., brand size variations)

unusual coupon activity as a percentage of total items purchased or percentage of manufacturer purchases by account, store, and cashier for a specified period.

By identifying possible variances in coupon activity, according to the system and method of the present invention, on the basis of comparison to the store, account or manufacturer's recent historical performance and by quickly calling to the attention of the retailer or manufacturer agent these variations, legitimate problems (e.g., non-scannable codes or mis-identified codes) as well as attempts at deceiving the manufacturer can be identified before they compound into larger dollar issues and complicate settlement between the parties.

Another use for the present invention lies in the area of temporary price reductions between manufacturers and retailers. Commonly referred to as "trade promotions", this class of promotions involves a manufacturer offering a significant temporary price reduction to the retailer in return for improved merchandising support by the retailers in the form of extra advertisement, in-store display or price reductions. Such deals typically take the form of a contract between the parties specifying what form of price reduction or free goods will be offered in return for what performance or action that the retailer expects to take. The timing and terms of mutual performance create frequent disputes between the parties with regard to the financial settlement. These disputes are commonly referred to as "deductions" and frequently lead to unilateral decisions by one or the other to withhold partial payment or demand extra funds. Deductions underlie a significant degree of cost and effort expended to resolve the settlement to both parties' satisfaction.

Manufacturer selects items for price reduction support by class of trade and coordinates a calendar of events which can be supported by available manufacturing capacity. Manufacturer also negotiates a contract with the retailer for reduced prices or a rebate given specified retailer performance. The retailer plans promotion events to achieve the required performance. He also communicates information on promotion activities throughout necessary internal functions. He purchases desired merchandise quantities based upon agreed-to price reduction. He summarizes necessary information on promotional support activities and invoices manufacturer or deducts the price discount from checks paid by retailer.

The manufacturer reviews retailer purchase history and retailer contractual performance measures and prepares check to retailer in accordance with internal/retailer supplied information. Manufacturer engages retailer finance/accounting personnel in resolving deductions as required. Retailer receives payment from manufacturer and has finance/accounting personnel resolve deductions as required.

The electronic audit of the trade promotion process, according to the present invention, utilizes the passive collection of actual POS data by item and by transaction to establish a database of performance. By tying the contract to performance, the electronic audit simplifies settlement and provides a clear record to both parties regarding the results of the event.

As before, the manufacturer selects items for price reduction support by class of trade and coordinates a calendar of events which can be supported by available manufacturing capacity. Manufacturers contract to reimburse retailers relative to the sales performance of the selected items (e.g., incremental sales volume relative to a benchmark such as unsupported normal volume or established trend line of sales volume for that retailer/retail chain). The retailer plans promotional events to achieve the desired performance and purchases the desired merchandise quantities based upon the agreed-to price reduction.

The system and method of the present invention electronically audits and tracks the results of the retailer's efforts while monitoring and recording all POS transactions as described earlier. Each transaction record is preferably retained in a history file for a predetermined period of time, perhaps 52 weeks to empirically determine what is the established (normal) sales volume for a particular product for a specified retailer, and independently documents any incremental sales volume increases to support the trade promotion settlement process. Predetermined and customized reports of these incremental sales volume increases, definitively documenting promotional performance on behalf of the retailer, is preferably sent to both the retailer and the manufacturer after each event to support the settlement process. As before, the retailer summarizes the necessary information on promotional support activities, including the report documentation if desired, invoices the manufacturer, and deducts the price discount from checks paid by the retailer to the manufacturer.

Thus, by crafting the promotional contract around performance goals evidenced by incremental sales volume increases, and having recourse to a valid third party audit of the performance achieved, both retailer and manufacturer have a clear and current factual record to use in resolving payment disputes. An audit according to the present invention materially reduces the current cost for both retailers and manufacturers to track, collate, and transmit data on performance. As a result, more prompt and accurate settlements between the parties materially reduce the cost of resolving the disputes fostered by the current process.

It should be understood by those skilled in the art that the present description is provided only by way of illustrative example and should in no manner be construed to limit the invention as described herein. Numerous modifications and alternate embodiments of the invention will occur to those skilled int he art. Accordingly, it is intended that the invention be limited only in terms of the following claims:

I claim:

1. A system for electronically auditing point-of-sale transactions, comprising:

at least one retail store, each store accepting coupons issued for use in connection with specific articles, each store having at least one partially automated point-of-sale system for processing a retail sales transaction in the normal operation of said retail store, the retail sales transaction comprising at least one coupon transaction stored as a coupon transaction record, including the universal product code (UPC) number of the article and the UPC number of the coupon;

a non-invasive automated electronic auditor disposed in each of said stores for monitoring said point-of-sale system in a substantially totally passive manner and for collecting a copy of each of said coupon transaction records, said electronic auditor including a sensor assembly for detecting said coupon transaction records and a computer processor coupled to said sensor assembly for processing said coupon transaction records;

said point-of-sale system operating independently of said electronic auditor, said electronic auditor operating responsive to said point-of-sale system without requiring any responsive operation by said point-of-sale system and without requiring any modification of said point-of-sale system; and an audit system processor remotely located from said at least one retail store for receiving said processed coupon transaction records, the audit system processor further for auditing the redemption of coupons to insure the coupons have been used only in connection with the specific articles for which the coupons were issued and auditing said coupon transaction record received from said automated electronic auditor for activity which is a predetermined statistical deviation from normal.

2. The automated system for electronically auditing point-of-sale transactions of claim 1, wherein said activity is increased coupon redemption.

3. The automated system for electronically auditing point-of-sale transactions of claim 1, wherein said activity is a high frequency of manual overrides.

4. The automated system for electronically auditing point-of-sale transactions of claim 1, wherein said activity is non-normal variations in universal product code distributions.

5. The automated system for electronically auditing point-of-sale transactions of claim 1, wherein said activity is extremely fast total transaction times.

6. The automated system for electronically auditing point-of-sale transactions of claim 1, wherein said audit system processor also audits said processed retail sales transaction data received from said automated electronic auditor for predetermined incremental increases relative to a benchmark in sales of at least one selected product.

7. The automated system for electronically auditing point-of-sale transactions of claim 6, wherein said benchmark is the unsupported normal volume for said at least one retail store.

8. The automated system for electronically auditing point-of-sale transactions of claim 6, wherein said benchmark is the established trend line of sales volume for said at least one retail store.

9. A method for electronically auditing point-of-sale transactions, comprising the steps of:

passively recording by an electronic audit system within a retail store an entire point-of-sale system sales transaction, the transaction comprising at least one coupon redemption;

storing by said electronic audit system said recorded entire sales transaction as a record in an audit transaction database, the record of the sales transaction including at least one coupon transaction record for the at least one coupon redemption, the at least one coupon transaction record including the UPC number of the purchased item and the UPC number of the coupon;

repeating said steps of recording and storing until a request for uploading of said stored records is received by said electronic audit system;

communicating to an audit system processor remotely located from said electronic audit system said stored records;

analyzing said at least one coupon transaction record based on predetermined guidelines stored in said audit system processor to audit the redemption of coupons to insure the coupons have been used only in connection with the specific articles for which the coupons were issued; and preparing reports based on results of said step of analyzing, said reports flagging activity of said point-of-sale system which is a predetermined statistical deviation from normal.

10. The method for electronically auditing point-of-sale transactions of claim 9, further comprising the step of sensing a state of a register at a point-of-sale system.

11. The method for electronically auditing point-of-sale transactions of claim 9, wherein said activity is increased coupon redemption.

12. The method for electronically auditing point-of-sale transactions of claim 9, wherein said activity is a high frequency of manual overrides.

13. The method for electronically auditing point-of-sale transactions of claim 9, wherein said activity is non-normal variations in universal product code distributions.

14. The method for electronically auditing point-of-sale transactions of claim 9, wherein said activity is extremely fast total transaction times.

15. A method for electronically auditing point-of-sale transactions, comprising the steps of:

passively recording by an electronic audit system within a retail store an entire point-of-sale system sales transaction, the transaction comprising at least one coupon redemption;

storing by said electronic audit system said recorded entire sales transaction as a record in an audit transaction database, the record of the sales transaction including at least one coupon transaction record for the at least one coupon redemption, the at least one coupon transaction record including the UPC number of the purchased item and the UPC number of the coupon;

repeating said steps of recording and storing until a request for uploading of said stored records is received by said electronic audit system;

communicating to an audit system processor remotely located from said electronic audit system said stored records;

analyzing said at least one coupon transaction record based on predetermined guidelines stored in said audit system processor to audit the redemption of coupons to insure the coupons have been used only in connection with the specific articles for which the coupons were issued; and preparing reports based on results of said step of analyzing, said reports flagging predetermined incremental increases relative to a benchmark in sales of at least one selected product.

16. The method for electronically auditing point-of-sale transactions of claim 15, wherein said benchmark is the unsupported normal volume for said retail store.

17. The method for electronically auditing point-of-sale transactions of claim 15, wherein said benchmark is the established trend line of sales volume for said retail store.

* * * * *